United States Patent

Souza et al.

[11] 3,913,258
[45] Oct. 21, 1975

[54] COLLAPSIBLE LIVE ANIMAL TRAP

[75] Inventors: Anthony J. Souza, Lancaster; Harlan W. Martin, New Holland, both of Pa.

[73] Assignee: Woodstream Corporation, Lititz, Pa.

[22] Filed: July 23, 1974

[21] Appl. No.: 490,951

Related U.S. Application Data

[63] Continuation-in-part of Ser. No. 251,790, May 9, 1972, Pat. No. 3,834,063.

[52] U.S. Cl. ............................ 43/60; 43/61; 43/70
[51] Int. Cl. ............................................ A01m 23/02
[58] Field of Search ................ 43/58, 60, 61, 62, 70

[56] References Cited
UNITED STATES PATENTS 3,834,063   9/1974   Souza et al. ........................... 43/61

Primary Examiner—Robert Peshock
Assistant Examiner—J. Q. Lever
Attorney, Agent, or Firm—Holman & Stern

[57] ABSTRACT

A collapsible live animal trap is disclosed which comprises a generally box-like cage including a top section, a bottom section, opposing side walls hingedly coupled along top and bottom edges thereof to both the top and bottom cage sections, respectively, opposing end walls hingedly coupled along an edge thereof to one of the top and bottom cage sections, and wherein at least one of the end walls is defined by a controllable folding door means for selectively providing an entrance and egress passage to and from the cage to effect trapping of an animal within the interior of the cage. Each of the side walls of the cage incorporates a hinge axis therein which is disposed parallel to the top and bottom edges and substantially equidistant therebetween about which the side walls are foldable. With this construction, the cage can be collapsed into a flattened state for transport by folding each of the end walls inwardly about the hinge coupling along the edge thereof, by inwardly displacing the hinge axis of each side wall such that each side wall is folded upon itself, and by thereafter displacing the top and bottom cage sections towards one another.

8 Claims, 4 Drawing Figures

COLLAPSIBLE LIVE ANIMAL TRAP

RELATED APPLICATIONS

This application is a Continuation-In-Part of copending application Ser. No. 251,790 filed May 9, 1972, now U.S. Pat. No. 3,834,063.

BACKGROUND OF THE INVENTION

This invention generally relates to animal traps and is particularly concerned with a so-called "live" animal trap of the type wherein an animal is trapped unharmed within a cage.

Many techniques and portable apparatus exist which effect the general function of trapping or holding animals such as squirrel, rabbit and the like. Typical of such traps are those which utilize spring-jaw arrangements which, when triggered, serve to snap shut upon an extremity such as a leg of the animal, oftentimes severely injuring the animal in the process. Another variety of traps are the so-called live animal traps which, by and large, comprise a cage serving to trap any animal that wanders thereinto in a fashion whereby the animal is totally unharmed. Traps of this latter type have enjoyed increasingly wide spread use due to their inherent humane characteristics.

Such live animal traps of the prior art generally comprise a box-like cage having at least one opening or passage therein, the opening being selectively sealed or closed by a door through operation of a triggering device placed within the cage and upon which bait such as food is placed. Accordingly, an animal lured through the opening of the cage by bait placed on the triggering device will subsequently trigger the triggering device which closes the door and serves to seal off the opening behind the animal, thus trapping the animal unharmed within the cage.

Certain disadvantages exist, however, with respect to these prior art live animal trap constructions. For example, it is obvious that the cage door must be quickly operative with a snap-action closing upon actuation of the triggering device so as not to allow the animal time to escape. Mechanisms utilized by the prior art to achieve this necessary function have usually been extremely complex and prone to failure. Additionally, the triggering device or mechanism utilized must be fail-safe in operation and must be sensitive to movement by the animal. On the other hand, the triggering operation cannot be overly sensitive for fear that simple jarring of the trap could accidentally effect closing of the door, thus rendering the interior of the trap inaccessible to animals. Prior art traps of this general type normally do not satisfactorily provide a trigger mechanism which operates in accordance with these requisite expectations. Additionally, when a so-called live animal trap of the type having a plurality of openings and doors is utilized, the trigger mechanisms of prior art cage constructions have been unable to reliably and simultaneously control the release of the plurality of doors. Further, due to the typical trigger construction of the prior art, it is difficult to "set" the trigger of such multi-door traps in a facile manner.

The majority of these difficulties associated with typical prior-art live animal trap constructions have been overcome by the provision of a new cage configuration such as is disclosed in Applicant's parent application Ser. No. 251,790 filed May 9, 1972 now U.S. Pat. No. 3,834,063, the disclosure of which is incorporated herein by reference. In that improved construction, a box-like cage was provided which had opposed substantially parallel pairs of sides, a separate removable top and a floor, with a passage for entrance and egress preferably provided in each end of the cage. A foldable door was disposed in each passage, with the door being movable between a folded or collapsed configuration to open the passage, and an unfolded configuration so as to close the associated passage, with the door normally being biased or urged into the unfolded configuration. A triggering device was disposed within the cage and connected to linkage means disposed exteriorly of the cage with the linkage means being operatively coupled to each door. When the triggering device was in a "cocked" or set position, the linkage means selectively retained each door in a folded configuration to keep the associated passage open. On the other hand, when the triggering device was tripped such as by an animal entering into the cage, each retained door was released through the linkage means such that the door quickly unfolded and snapped shut so as to trap the animal.

The improved construction of the copending patent application provided numerous advantages, in that the door mechanism effectively resisted any attempt by an animal caught within the cage to escape, and in that the trigger mechanism and linkage therefor could be easily and reliably set. However, even this improved cage construction still presented difficulties to the user whenever it was desired to transport the cage from one location to another.

In this respect, and as can be appreciated, live animal traps of the type disclosed in the copending application are rather bulky in size and, due to such bulk, are difficult to ship or otherwise transport from one location to another. The trap of the prior application did indeed incorporate some features of construction whereby the trap could be collapsed upon itself for transport, specifically through the removal of the separate top section and by thereafter inwardly folding upon itself both side walls and the end walls containing the door mechanism. While this previously disclosed "collapsable" configuration certainly constituted an advance in the art, the previous design still exibited certain inconvenient features. For example, to effect "collapse" of the cage, the entire top portion of the cage had to be removed i.e. the cage itself had to be detached and disassembled, an operation in which a considerable amount of time could be expended.

SUMMARY OF THE INVENTION

This invention has as its primary objective the provision of a cage which exhibits all of the advantages of the cage disclosed in Applicant's copending application Ser. No. 251,790 now U.S. Pat. No. 3,834,063, and additionally is such that collapse of the cage into a flattened configuration can readily and quickly be effected so as to facilitate transport of the cage from one location to another.

In this respect, and in a manner similar to that which has been previously disclosed by Applicant, the new improved cage construction of the instant invention will be seen to incorporate a generally box-like configuration which includes a top section, a bottom section, opposing side walls, and opposing end walls, with at least one of the end walls being defined by a controllable folding door arrangement which selectively provides an entrance and egress passage to and from the cage to effect trapping of an animal within the interior thereof. Additionally, in a fashion similar to that which applicant has previously disclosed, a trigger mechanism, such as a rocking pan having a cocked and a tripped position, is contemplated to be disposed within the cage, with linkage means being disposed outside the cage for coupling the trigger means to the door, the door means being maintained open when the trigger means is cocked and being released so as to close when the trigger means is tripped such as by an animal within the cage.

Importantly, and at the heart of the invention, the live animal trap or cage herein is constructed to be fully collapsable in that the opposing side walls are hingedly coupled along the top and bottom edges thereof to both the top and bottom cage sections, respectively. The opposing end walls are similarily hingedly coupled along an edge thereof to only one of the top or bottom cage sections. Further, each of the side walls incorporates a hinge axis therein which is disposed parallel to the top and bottom edges and substantially equidistant therebetween, about which hinge axis the side walls are foldable. With this articulated construction, the cage can be collapsed into a flattened state for transport by folding each of the end walls inwardly about their hinge coupling along the edge thereof, by inwardly displacing the hinge axis of each side wall such that each side wall is folded upon itself, and by thereafter displacing the top and bottom cage sections towards one another. It should be appreciated that no disassembly of the cage is necessary with this improved collapsable construction and the cage can quickly be collapsed into its flattened state for transport.

BRIEF DESCRIPTION OF THE DRAWINGS

The invention will be better understood and additional features and advantages thereof will become apparent from the following detailed description of a preferred inventive embodiment, such description making reference to the appended sheets of drawings, wherein.

DETAILED DESCRIPTION OF A PREFERRED INVENTIVE EMBODIMENT

Figure 1:
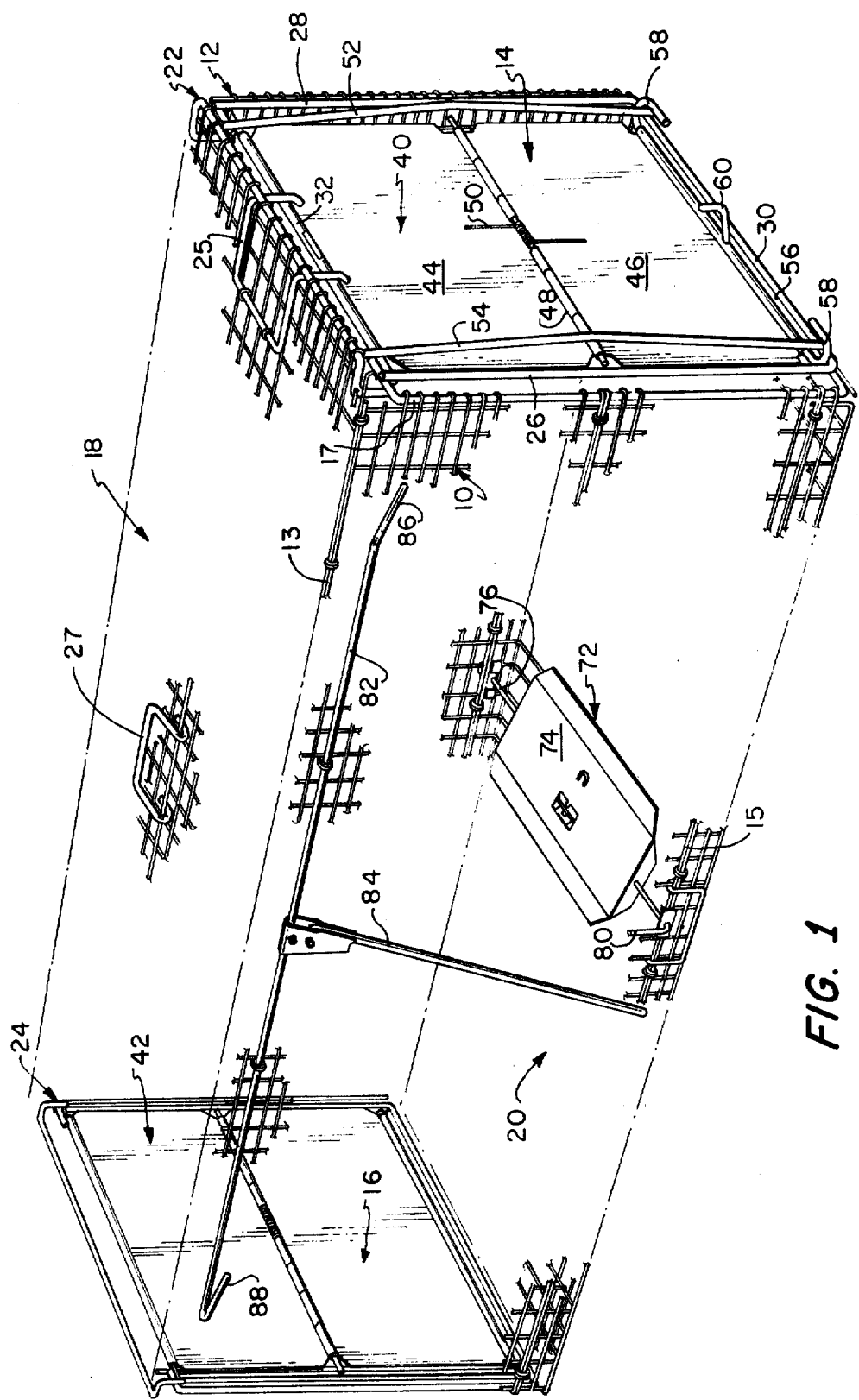
FIG. 1 is a perspective illustration of the novel live animal trap of the instant invention.

Referring now to the drawings and particularly to FIG. 1 thereof, the novel live animal trap of the instant invention will be seen to comprise a box-like cage having opposed substantially parallel pairs of sides such as sides 10 and 12, end walls 14 and 16, respectively, a top portion generally designated by reference numeral 18, and a bottom portion 20 constituting the floor of the cage. Each of the sides 10 and 12, as well as the top and bottom portions 18 and 20 of the cage are constructed of mesh-like wire, such as chicken wire.

A rectangular wire supporting frame generally designated by reference numerals 22 and 24 are respectively provided about the periphery of each of the two end walls of the cage 14 and 16, each frame having two vertically upstanding parallel wire posts 26 and 28, as well as two horizontally disposed and parallelly spaced wire supports 30 and 32. Wire frames 22 and 24 give structural support to the box-like cage in its assembled configuration as is depicted in FIG. 1.

A passage for entrance and egress to and from the interior of the cage is provided in at least one, and preferably in both of the sides 14 and 16. Foldable door means generally designated by reference numerals 40 and 42 are disposed in each passage. In the preferred inventive embodiment, each of the door means 40 and 42 will be seen to comprise planar sections 44 and 46, these sections being hingedly connected together along a fold axis 48. Each of the door means 40 and 42 are movable between a folded and collapsed configuration wherein the passage in the sides of the cage is open, and an unfolded configuration wherein the passage in either end of the cage is closed. Door means 40 and 42 are normally urged or biased into the unfolded configuration depicted in FIG. 1 via biasing means, such as spring 50, therefor. It should be appreciated, however, that spring 50 may be eliminated and door means 40 and 42 would thereby operate under the biasing effect of gravity in the manner to be described hereinbelow.

During folding and unfolding motion of the door means 40 and 42, such door means are guided by guide means comprising a pair of elongated parallel vertical bars 52 and 54 associated with each of the wire frames 22 and 24, respectively. The elongated vertical bars 52 and 54 are bowed outwardly and are welded or otherwise fixedly attached at their upper ends thereof to the horizontal wire support 32 of frame members 22 and 24 and are welded or otherwise fixedly attached at their lower ends thereof to the horizontal wire support 30 of frame 22 and 24. As mentioned above, the upper section 44 of each of the door means 40 and 42 is hingedly attached about the horizontal wire support 32 of each frame and the other section 46 of each of the door means 40 and 42 is loosely clamped about the vertical bars 52 and 54 by means of a horizontally disposed wire member 56 having hooks or eyes 58 at each of the ends thereof adapted to slidably encircle the vertical bars 52 and 54, the wire member 56 having a bent tab portion 60 by which the folding of the door 40 and 42 can be hand manipulated in a manner to be discussed.

Trigger means generally designated by reference numeral 72 are disposed within the cage and, in the preferred inventive embodiment, will be seen to comprise a pan 74 disposed about an axel 76 for rocking movement between the two opposing sides 10 and 12 of the cage. Axel 76 is pivotally mounted through each of the side walls 10 and 12 and terminates in a lever arm 80 which extends exteriorly of the cage. Axel 76 and its terminating lever arm 80 are rigidly attached to the pan 74 such that when the pan 74 is rocked or moved, lever arm 80 likewise moves along an arcuate path.

Lever arm 80 as well as an elongated generally T-shaped rod 82 hingedly disposed to the depending side walls 64 of the top 18 form a linkage mechanism coupling the trigger or pan 74 to the various door means 40 and 42 in a manner to be described. It should be recognized that the elongated rod 82 has a downwardly depending stub or base section 84 which cooperates with the upwardly extending lever arm 80 as will be described, as well as two inwardly directed legs 86 and 88 to either end thereof, which legs will be seen to cooperate with the bent or clamped hooks 58 of wire 56 associated with the lower planar section 46 of each of the door means 40 and 42. The exact manner of operation, i.e., setting and triggering of the trap as above-described will be discussed hereinbelow.

In operation, bait is initially placed and secured to the trigger pan 74. The door means 40 and 42 are then pushed inwardly about the fold axis 48 and lifted by the operator of the cage by the outwardly extending tab 60 coupled to the lower planar section 46 of each door. In this fashion, each of the doors 40 and 42 are moved upwardly with the fold axis 48 extending inwardly into the cage, each of the door means 40 and 42 assuming a folded configuration. Thereafter, the elongated rod 82 comprising the linkage as above-discussed and hingedly disposed to the downwardly depending walls 64 of the top 18 is then moved into a position such that the stub portion 84 is vertically disposed and such that the end legs 86 and 88 are horizontally directed toward the opposing side of the cage. In this position, the extending tabs 86 and 88 engage underneath the bent clamping portions or hooks 58 of the rod 56 through the lower planar section 46 of each of the door means in this folded configuration against the action of the spring biasing means 50, simply through the utilization of one hand holding the downwardly depending stub 84 in a vertical position. The lever arm 80 and the trigger pan 74 to which the lever arm 80 is rigidly affixed is then moved with the other hand of the cage operator so that lever arm 80 likewise assumes a vertical position, immediately on the inside of lever arm 80, the mating sections of the lever arm 80 and downwardly depending stub 84 of rod 82 being machined so as to define corresponding curvilinear surfaces.

The operator of the cage would subsequently let go of the downwardly depending stub 84 and, the downward pressure exerted on each of the legs 86 and 88 of the rod 82 by the urging of spring means 50 of each of the doors 40 and 42 tends to move the elongated rod 82 in a clockwise direction, which clockwise motion tends to urge the depending stub 84 to swing into engagement with the upwardly extending lever 80 of the pan 74, this spring pressure serving to "seat" the stub 84 upon the lever 80. The trap of the instant invention is now in a "set" or cocked condition.

When an animal enters the cage through the open door means 40 and 42, lured by the bait attached to the trigger mechanism 72, any rocking motion of the pan 74 such as would be caused by the animal is effective to "trip" the lever 80. Specifically, a rocking motion of pan 74 serves to swing the lever arm 80 either to the right or to the left, and in this position, the stub portion 84 of the elongated rod 82 no longer is in a mating relationship underneath the lever 80. As such, the downward pressure exerted upon each of the end legs 86 and 88 of the elongated rod 82 serves to effect clockwise rotation of rod 82. With such clockwise rotation, the end legs 86 and 88 no longer engage underneath the bent clamps or hooks 58 of wire 30 of each of the door means 40 and 42, and thus the door means 40 and 42 quickly slide downwardly about the vertical elongated guide bars 52 and 54 into an unfolded or closed configuration. The animal within the cage of the instant invention is now trapped and it should be appreciated that, due to the above-described mounting of the doors 40 and 42, any pressure exerted on such doors from the inside of the cage by the trapped animal only serves to effect a better seal and closing of the cage.

Details of the above-described operation of the folding door mechanism, the triggering mechanism, and the linkage can be found in Applicants copending application Ser. No. 251,790 filed May 9, 1972 and attention is therein directed.

As mentioned at the outset, the heart of the instant invention and the primary difference between the instant invention and Applicant's prior cage resides in the collapsable cage configuration. In this respect, it should be noted that each of the opposing side walls 10 and 12 are hingedly coupled by wire rod hinges 13 and 15 along the top and bottom edges thereof to both the top and bottom cage sections 18 and 20, respectively. The opposing end walls 14 and 16 are similarly hingedly coupled along only one edge thereof, such as about the horizontal wire support 30, to the bottom cage section 20, though it should be appreciated that in an alternative configuration, the opposing end walls could be hingedly coupled along their top edges to the top section 18 of the cage. Additionally, and as can best be seen from FIG. 2, each of the side walls 10 and 12 incorporate a wire hinge axis 17 therein which is disposed parallel to the top and bottom edges and substantially equidistant therebetween. Each of the side walls 10 and 12 are foldable about hinge axis 17 in a fashion which best can be appreciated by reference to FIG. 3 of the application drawings. These basic features of the novel cage of the instant invention are such that the cage configuration is entirely collapsable into a flattened state.

Figure 2:
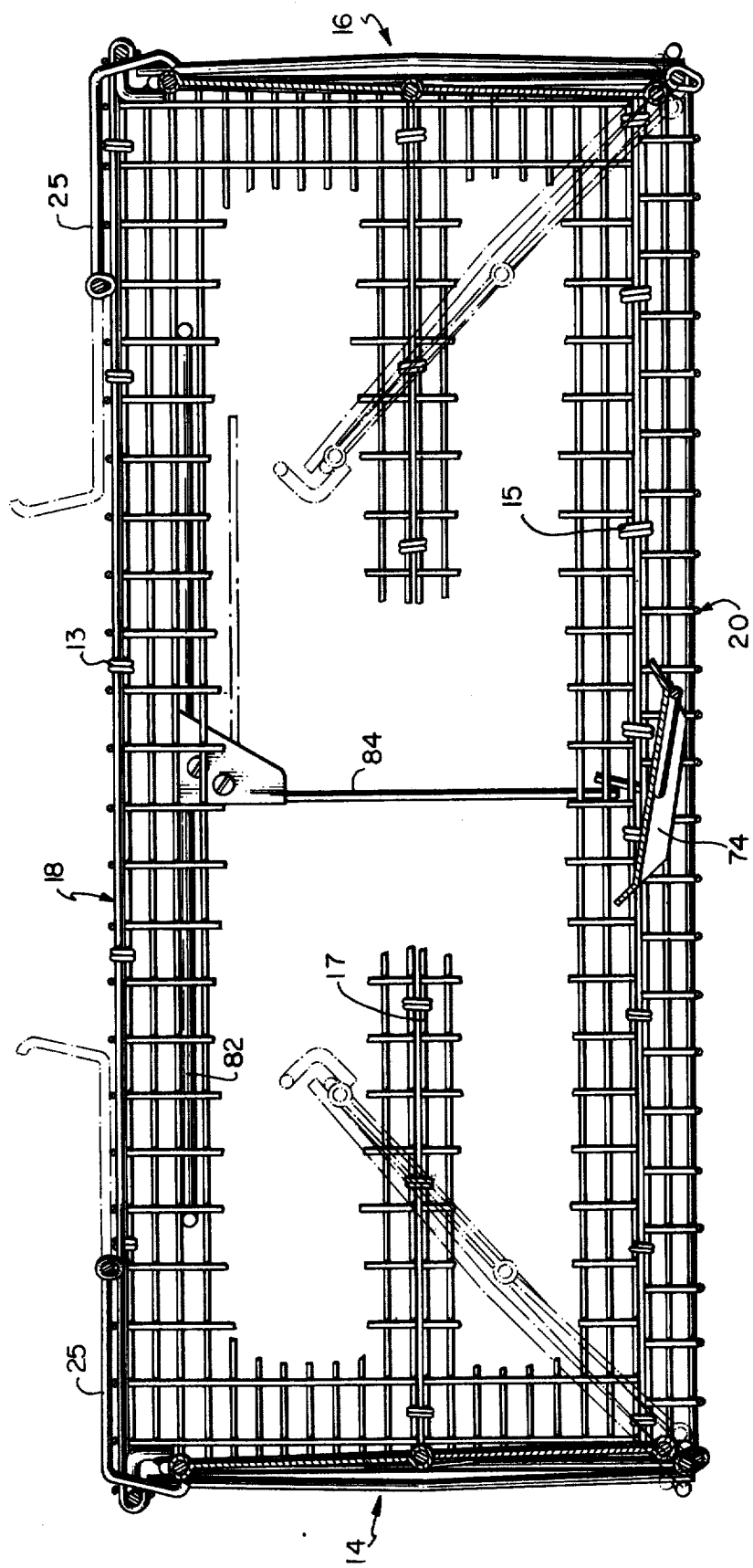
FIG. 2 is a side plan view of the novel trap of the instant invention which depicts, in dotted lines, alternative positions of several elements so as to initiate collapse of the cage.
Figure 3:
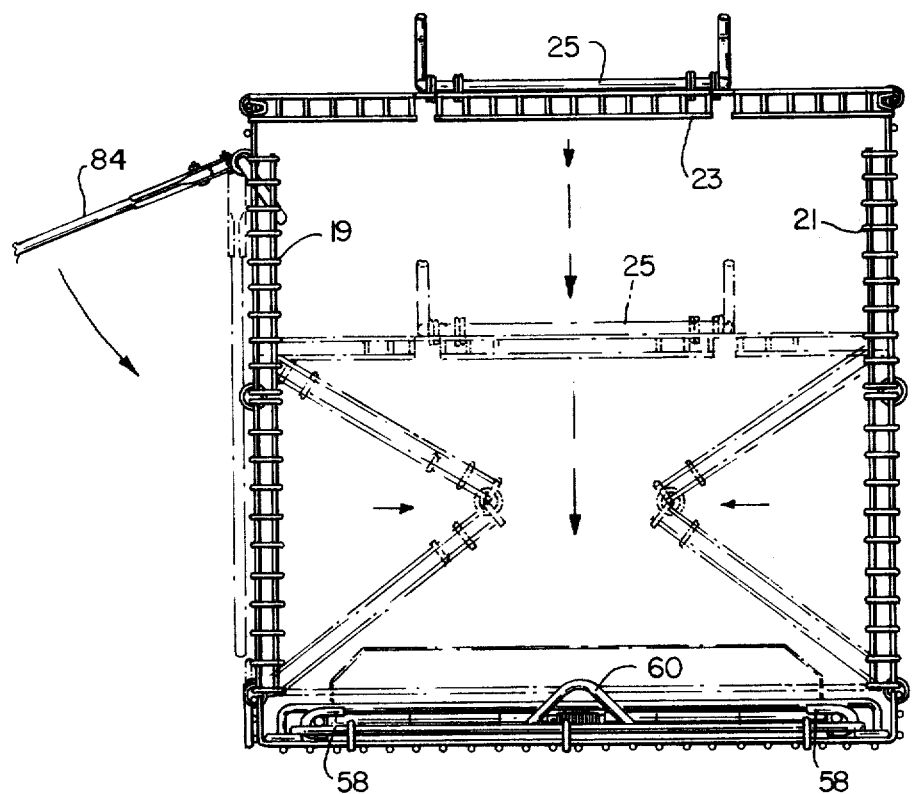
FIG. 3 is an end elevational view of the novel trap of the instant invention depicting the manner in which the side walls are folded in upon one another in the process of cage collapse.
Figure 4:
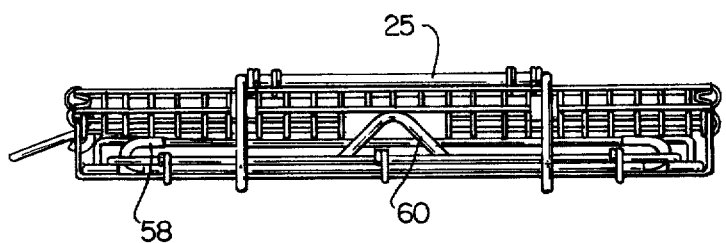
FIG. 4 is an end elevational view depicting the cage in a fully collapsed state.

For example, and with reference to FIG. 2 of the application drawings, each of the end walls 14 and 16 would initially be folded inwardly about the hinge coupling disposed along the bottom edge thereof. In this fashion, each of the ends walls would come to rest in a flattened state along the bottom 20 of the cage. Subsequently, the hinge axis 17 of each of the side walls 10 and 12 would be inwardly displaced such as is depicted in FIG. 3 of the application drawings and such that each side wall is folded upon itself. Thereafter, the top and bottom cage sections 18 and 20 would be displaced towards one another as also is depicted in FIG. 3, resulting in an entirely collapsed cage configuration such as is depicted in FIG. 4.

Several additional details of the cage configuration disclosed above are of significant enough interest with respect to the collapsability feature to require additional description and, in this respect, attention is again directed to FIGS. 1 and 3 of the application drawings. In this respect, it should be noted that the wire frame 22 surrounding each of the end walls 14 and 16 incorporates an additional outer surrounding perimeter rod 17 which encircles the end walls 14 and 16 along both sides and the top. The adjoining edges of both side walls 10 and 12 and the top cage section 18 are looped back upon itself as is indicated by reference numerals 19, 21, and 23 in FIG. 3 of the drawings so as to form a hook-like configuration which is engaged about the perimeter rod 17. This arrangement prevents the door means 40 and 42 from folding outwardly and further provides rigidity to the trap structure.

Additionally, it should be noted as can best be seen from FIG. 2 of the application drawings, that a pair of catch means 25 and 27 are disposed on the top section 18 of the cage immediately above the end walls 14 and 16, respectively. When these catch means, which constitutes an L-shaped wire member are in the fullline position as shown in FIG. 2, they serve to engage about the upper horizontal wire support 32 of frame members 22 and 24 to thereby hold the end walls in an upright position. When the catch means 25 and 27 are swung upwardly into the dotted-line position as depicted in FIG. 2, the end walls 14 and 16 are released, enabling the end walls to be swung upwardly towards the interior of the cage such that the end walls can assume the dotted-line position in FIG. 2 during the cage collapsing process. Once the cage assumes its collapsed and substantially flattened configuration as is depicted in FIG. 4, the catch means 25 then can serve to maintain the cage in its collapsed state by preventing an unfolding of the side walls as is shown in FIG. 4. This allows for the cage to be carried, even in a collapsed state through the provision of an external handle 27 as is shown in FIG. 1.

Lastly, and so as to ensure a compact package upon collapse of the cage, the stub or base section 84 of the linkage mechanism is pivotally attached to the upper portion of the T linkage arm 82 such that the base of the T can be pivoted into a position substantially parallel with the top of the T as is illustrated by the dotted-line position of element 84 in FIG. 2 of the drawings.

It should now be apparent from the foregoing detailed description that the objective set forth hereinabove has been successfully achieved in that the improved cage construction of Applicant's prior application Ser. No. 251,790 has been modified to be collapsible for ease of transport. Moreover, while there has been shown and described a present preferred embodiment of the invention, it is to be distinctly understood that the invention is not limited thereto but may be otherwise variously embodied and practiced within the scope of the following claims. ACCORDINGLY,

What is claimed is:

1. A collapsible live animal trap comprising a generally box-like cage including a top section; a bottom section; opposing side walls hingedly coupled along top and bottom edges thereof to both said top and bottom cage sections respectively; opposing end walls hingedly coupled along an edge thereof to one of said top and bottom cage sections, at least one of said end walls being defined by a controllable door means for selectively providing an entrance and egress passage to and from said cage to effect trapping of an animal within the interior of said cage; and wherein each of said side walls further incorporates a hinge axis therein disposed parallel to said top and bottom edges and substantially equidistant therebetween about which said side walls are foldable; whereby said cage can be collapsed into a flattened state for transport by folding each said endwall inwardly about said hinge coupling along said edge thereof, by inwardly displacing said hinge axis of each sidewall such that each sidewall is folded upon itself, and by thereafter displacing said top and bottom cage sections towards one another.

2. A collapsible trap as defined in claim 1, wherein said door means is itself foldable about a fold axis, said door means being movable between a folded and collapsed configuration wherein said passage is open and an unfolded configuration wherein said passage is closed, said door means normally being urged into said unfolded configuration via biasing means therefor; trigger means having a cocked and a tripped position disposed within said cage, and linkage means disposed outside said cage for coupling said trigger means to said door means such that said door means is retained in said folded configuration against the action of said biasing means when said trigger means is cocked, said trigger means, when tripped such as by an animal within said cage, releasing said door means through said linkage means, whereby said door means snaps shut so as to trap the animal.

3. A collapsible trap as defined in claim 2, wherein said trigger means comprises a pan hingedly disposed for rocking movement between the two opposing sidewalls of said cage above said bottom section, said linkage comprising a lever arm rigidly connected to said pan and extending exteriorly of said cage, and a single latching rod disposed exteriorly of said cage along one side thereof and coupled to said lever arm, said latching rod being operative upon any movement of said lever arm to swing from a latching position wherein said door means is released.

4. A collapsible trap is defined in claim 3, wherein said single latching rod has a generally T-shaped configuration, the top of said T being pivotally connected to one of said sidewalls and disposed substantially parallel to said top edge thereof, the base of said T being selectively coupled to said lever arm and further being pivotally attached to the top of said T such that, in the collapsed state of said cage, the base of said T can be pivoted into a position substantially parallel with the top of said T.

5. A collapsible trap as defined in claim 4, further including a pair of catch means disposed on the other of said top and bottom cage sections above the respective end walls for selectively holding said end walls in an upright position, whereby said cage, when assembled, is rigidly maintained in its box-like configuration.

6. A collapsible trap as defined in claim 2, wherein said door means comprises planar sections hingedly connected together along said fold axis, said sections of said door means being substantially coplanar whereby said associated passage is closed when said door means is in said unfolded configuration, and guide means about said door for slidably guilding said door means between said folded and unfolded configurations such that said door means is only collapsible inwardly toward the interior of said cage about said fold axis.

7. A collapsible trap as defined in claim 6, wherein said biasing means for said door means comprises a spring urging said two sections into a coplanar position whereat said door means is in said unfolded configuration.

8. A collapsible trap as defined in claim 1, wherein said top and bottom sections and said sidewalls are constructed of wire mesh.

* * * * *

Dedication 3,913,258.—*Anthony J. Souza*, Lancaster and *Harlan W. Martin*, New Holland, Pa. COLLAPSIBLE LIVE ANIMAL TRAP. Patent dated Oct. 21, 1975. Dedication filed Aug. 22, 1978, by the assignee, *Woodstream Corporation*.

Hereby dedicates to the Public the entire remaining term of said patent.
[*Official Gazette October 17, 1978.*]